US009009676B2

(12) United States Patent
Chua et al.

(10) Patent No.: US 9,009,676 B2
(45) Date of Patent: Apr. 14, 2015

(54) COMMON RECORDING AND REPLAYING PERFORMANCE TEST TOOL FOR A CLIENT-SERVER ENVIRONMENT

(75) Inventors: Stevenson Chua, Edmonton (CA); Rakesh Kumar Dash, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 12/753,617

(22) Filed: Apr. 2, 2010

(65) Prior Publication Data
US 2011/0246971 A1 Oct. 6, 2011

(51) Int. Cl.
G06F 9/45 (2006.01)
G06F 11/34 (2006.01)

(52) U.S. Cl.
CPC ...... *G06F 11/3414* (2013.01); *G06F 2201/875* (2013.01)

(58) Field of Classification Search
CPC .................................................. G06F 11/3414
USPC ........................................................ 717/127
See application file for complete search history.

(56) References Cited

U.S. PATENT DOCUMENTS

| 5,774,717 | A  | * | 6/1998  | Porcaro ........................... 1/1 |
| 5,960,436 | A  | * | 9/1999  | Chang et al. ..................... 1/1 |
| 5,974,572 | A  | * | 10/1999 | Weinberg et al. ............. 714/47.2 |
| 6,119,247 | A  | * | 9/2000  | House et al. ................ 714/38.14 |
| 6,145,121 | A  | * | 11/2000 | Levy et al. ..................... 717/135 |
| 6,249,886 | B1 |   | 6/2001  | Kalkunte |
| 6,253,228 | B1 | * | 6/2001  | Ferris et al. ................... 709/203 |
| 6,286,046 | B1 | * | 9/2001  | Bryant ............................. 709/224 |
| 6,311,327 | B1 | * | 10/2001 | O'Brien et al. ................ 717/114 |
| 6,321,263 | B1 | * | 11/2001 | Luzzi et al. .................... 709/224 |
| 6,463,578 | B1 | * | 10/2002 | Johnson ......................... 717/124 |
| 6,543,011 | B1 | * | 4/2003  | Schumacher et al. .......... 714/45 |
| 6,567,767 | B1 |   | 5/2003  | Mackey et al. |
| 6,587,969 | B1 | * | 7/2003  | Weinberg et al. ............... 714/46 |
| 6,609,084 | B2 | * | 8/2003  | Midde Peddanna .......... 702/186 |
| 6,631,345 | B1 | * | 10/2003 | Schumacher et al. .......... 703/22 |

(Continued)

FOREIGN PATENT DOCUMENTS

JP 2000200230 A 7/2000
JP 2002073431 A 3/2002

(Continued)

OTHER PUBLICATIONS

Cheng, Yuchung, et al. "Monkey See, Monkey Do: A Tool for TCP Tracing and Replaying." USENIX Annual Technical Conference, General Track. 2004.*

(Continued)

*Primary Examiner* — Wei Zhen
*Assistant Examiner* — Matthew Brophy
(74) *Attorney, Agent, or Firm* — Sughrue Mion, PLLC

(57) ABSTRACT

A method, system and computer program product for recording and replaying a program execution in a client-server environment capable of supporting different client-server communication protocols. A common recorder of the exemplary embodiments identifies respective class files and libraries used by a client application to process client actions and data passed in client requests and server responses. The recorder stores class files and data in a replay file and later re-creates server loads and client actions based on the class files, data and client action results in the replay file during a replay of the execution.

14 Claims, 8 Drawing Sheets

(56) References Cited

U.S. PATENT DOCUMENTS

| | | | |
|---|---|---|---|
| 6,694,288 B2 | 2/2004 | Smocha et al. | |
| 6,721,941 B1 * | 4/2004 | Morshed et al. | 717/127 |
| 6,763,380 B1 | 7/2004 | Mayton et al. | |
| 6,862,711 B1 * | 3/2005 | Bahrs et al. | 715/205 |
| 6,865,692 B2 * | 3/2005 | Friedman et al. | 714/25 |
| 6,918,106 B1 * | 7/2005 | Burridge et al. | 717/100 |
| 7,010,532 B1 | 3/2006 | Stakutis et al. | |
| 7,072,951 B2 * | 7/2006 | von Klopp et al. | 709/219 |
| 7,171,588 B2 * | 1/2007 | Friedman et al. | 714/38.12 |
| 7,191,441 B2 * | 3/2007 | Abbott et al. | 718/1 |
| 7,257,516 B2 | 8/2007 | Arora et al. | |
| 7,269,603 B1 * | 9/2007 | Dewan et al. | 1/1 |
| 7,376,917 B1 | 5/2008 | Lazarut et al. | |
| 7,506,047 B2 * | 3/2009 | Wiles, Jr. | 709/224 |
| 7,543,000 B2 * | 6/2009 | Castro et al. | 1/1 |
| 7,552,424 B1 * | 6/2009 | Bischof et al. | 717/127 |
| 7,613,597 B2 * | 11/2009 | Vertes | 703/2 |
| 7,752,604 B2 * | 7/2010 | Genkin et al. | 717/125 |
| 7,809,728 B2 * | 10/2010 | Takahashi et al. | 707/741 |
| 8,001,531 B1 * | 8/2011 | Rideout et al. | 717/124 |
| 8,024,299 B2 * | 9/2011 | Dias et al. | 707/660 |
| 8,145,705 B1 * | 3/2012 | Rust | 709/203 |
| 8,185,910 B2 * | 5/2012 | Swildens | 719/310 |
| 8,639,796 B2 * | 1/2014 | Covell et al. | 709/224 |
| 2002/0065911 A1 * | 5/2002 | von Klopp et al. | 709/224 |
| 2002/0156881 A1 * | 10/2002 | Klopp Lemon et al. | 709/224 |
| 2003/0033118 A1 * | 2/2003 | Peddanna | 702/186 |
| 2003/0055883 A1 * | 3/2003 | Wiles, Jr. | 709/203 |
| 2003/0208476 A1 * | 11/2003 | Heddings et al. | 707/3 |
| 2004/0078684 A1 * | 4/2004 | Friedman et al. | 714/38 |
| 2004/0107415 A1 * | 6/2004 | Melamed et al. | 717/124 |
| 2004/0268314 A1 * | 12/2004 | Kollman et al. | 717/128 |
| 2006/0047496 A1 * | 3/2006 | Genkin et al. | 703/22 |
| 2007/0288619 A1 * | 12/2007 | Jun et al. | 709/223 |
| 2008/0065702 A1 * | 3/2008 | Dickerson et al. | 707/202 |
| 2008/0097960 A1 * | 4/2008 | Dias et al. | 707/2 |
| 2008/0141221 A1 * | 6/2008 | Benesovska et al. | 717/124 |
| 2009/0037914 A1 * | 2/2009 | Chagoly et al. | 718/101 |
| 2009/0089404 A1 * | 4/2009 | Guo | 709/219 |
| 2010/0005455 A1 * | 1/2010 | Gyure et al. | 717/128 |
| 2010/0058366 A1 * | 3/2010 | Swildens | 719/329 |
| 2010/0115496 A1 * | 5/2010 | Amichai | 717/135 |
| 2011/0225569 A1 * | 9/2011 | Beaty et al. | 717/127 |

FOREIGN PATENT DOCUMENTS

| | | |
|---|---|---|
| JP | 2003173277 A | 6/2003 |
| WO | 2005/071560 A1 | 8/2005 |

OTHER PUBLICATIONS

Draheim, Dirk, et al. "Realistic load testing of web applications." Software Maintenance and Reengineering, 2006. CSMR 2006. Proceedings of the 10th European Conference on. IEEE, 2006.*

Hwang, Gwan-Hang, Sheng-Jen Chang, and Huey-Der Chu. "Technology for testing nondeterministic client/server database applications." Software Engineering, IEEE Transactions on 30.1 (2004): 59-77.*

Elbaum, Sebastian, et al. "Leveraging user-session data to support web application testing." Software Engineering, IEEE Transactions on 31.3 (2005): 187-202.*

Gerrand et al "Client/Server Performance Testing". EuroSTAR, Nov. 1995, pp. 1-25, London.

* cited by examiner

COMMON RECORDING AND REPLAYING PERFORMANCE TEST TOOL FOR A CLIENT-SERVER ENVIRONMENT

FIELD OF THE INVENTION

The invention relates generally to computer software development, and more particularly, to a common recording and replaying performance test tool capable of supporting different client-server protocols.

BACKGROUND

Record and replay is a technique that allows the execution of a software application to be recorded so that it can be played back at a later time and often in a different system environment. Record and replay is commonly used for performance testing in software development. In a client-server environment, record and replay performance test tools need to be concerned with the various protocols that the client and the server use to communicate with each other. In addition to the complexity and changing nature of communication protocols, each protocol typically has a unique set of requirements and interface components through which it interacts with the operating system. A record and replay performance test tool must support these unique requirements and work with the protocol interfaces in order to properly record and replay the execution of the application.

In a client-server environment, the client and the server can communicate with each other using one or more protocols like the Hypertext Transfer Protocol (HTTP), Java Remote Method Protocol (JRMP), Internet Inter-ORB Protocol (IIOP), Simple Object Access Protocol (SOAP), and Common Object Model (COM). The services associated with these protocols can be implemented in numerous ways, which make it difficult to have a single record and replay performance test tool that works with the different protocol implementations. In addition, the architecture of a client-server application varies from one operating environment to another depending on the type of the application. As a result, performance testing in such a client-server environment with a performance tool generally involves recording and replaying the actions that a user performs and the resulting processes.

Current recording tools typically provide a recording in a performance test either by using a proxy to intercept the user requests or creating client requests on the fly based on the user requests and the service definition language involved. Input to the program being recorded is sent through this proxy. The proxy examines client request and server response messages to capture the data that will be required for a replay of the program execution. In particular, the tool must examine network packets to extract relevant information and map this information to corresponding protocol messages being exchanged by the client and the server.

In a second type of record and replay tools, the tools must be able to recognize the service definition language being used in the communication between the client and the server and the operations defined by the service implementation of the respective communication protocol. Examples of the service definition languages include the Web Service Definition Language (WSDL) and the Interface Description Language (IDL). The tools then simulate client applications on the fly based on the client-server operation data that it captured.

A drawback of the above recording techniques is that the recording tools cannot be reused among the various protocols that the client and server use to communicate with each other because the interfaces and definitions are implemented differently in the protocols. In addition, the capturing of network packets during a client-server communications and mapping them to a particular protocol implementation will not work in all situations due to variations in the implementations of the underlying protocols.

For the recording performance test tools that are based on the service definition languages, tool developers face another challenge in the fact that not all applications and services use a definition language that allows data to be captured by the performance tools. In addition, this recording technique is more aligned towards Web services or Simple Object Access Protocol-based applications and generally cannot be applied to other types of service applications. As a result, with the emerging new client-server technologies, these performance test tools must be regularly updated with multiple recorders or protocol adapters that support new communication protocols and service implementations in order to be useful.

From the foregoing, it is appreciated that there still exists a need for a common record and replay performance test tool that is capable of recording a program execution and playing it back in different environments without the aforementioned drawbacks.

SUMMARY

The invention relates to a method, system and computer program product for recording and replaying a program execution in a client-server environment by initially identifying class files associated with a client application for initiating client actions during the program execution and identifying data passed in client application requests and data returned in server responses. The identified class files and data are stored in a replay file. During a replayed execution, data in the replay file is used by the recording and replaying tool to generate server loads and recreate the client application processes.

The details of the exemplary embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
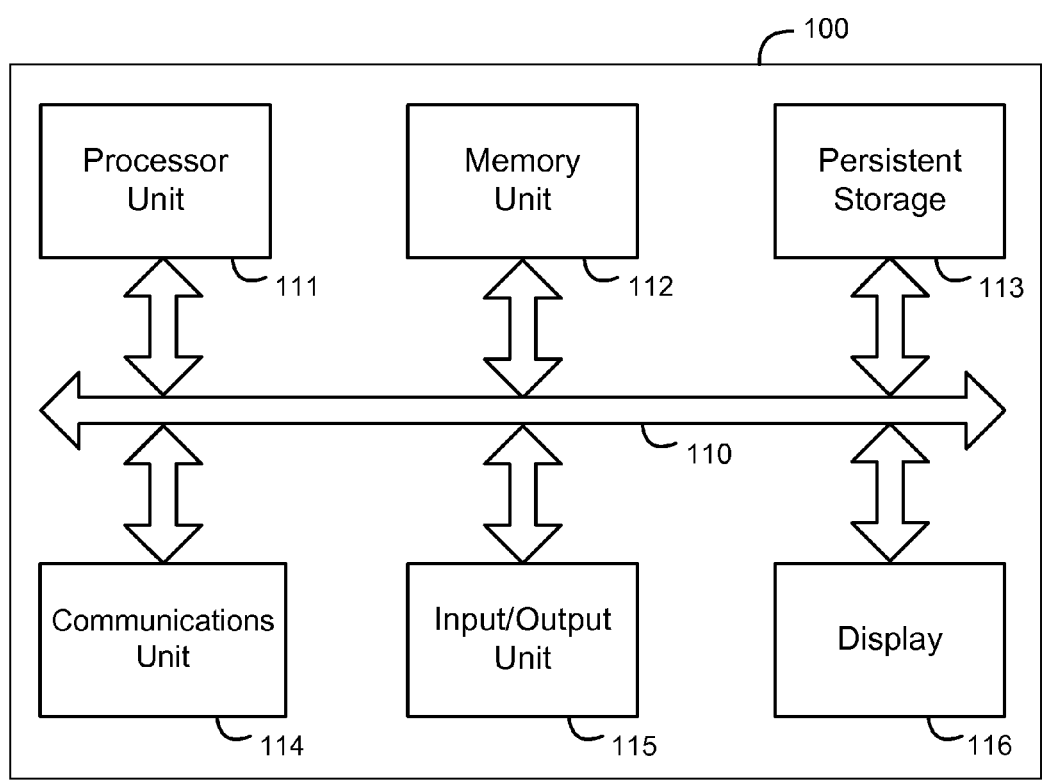
FIG. 1 is a block diagram of an exemplary data processing system in which aspects of the present invention might be implemented.

The invention relates to a method, system and computer program product for commonly recording and replaying a program execution in a client-server environment that supports different client-server communication protocols.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings and in particular to FIG. 1, there is depicted a block diagram of a data processing system in which aspects of the present invention might be implemented. As shown, a data processing system 100 includes a processor unit 111, a memory unit 112, a persistent storage 113, a communications unit 114, an input/output unit 115, a display 116, and system bus 110. Computer programs are typically stored in persistent storage 113 until they are needed for execution, at which time the programs are brought into memory unit 112 so that they can be directly accessed by processor unit 111. Processor 111 selects a part of memory 112 to read and/or write by using an address processor 111 gives to memory 112 along with a request to read and/or write. Usually, the reading and interpretation of an encoded instruction at an address causes processor 111 to fetch a subsequent instruction, either at a subsequent address or some other address.

Figure 2:
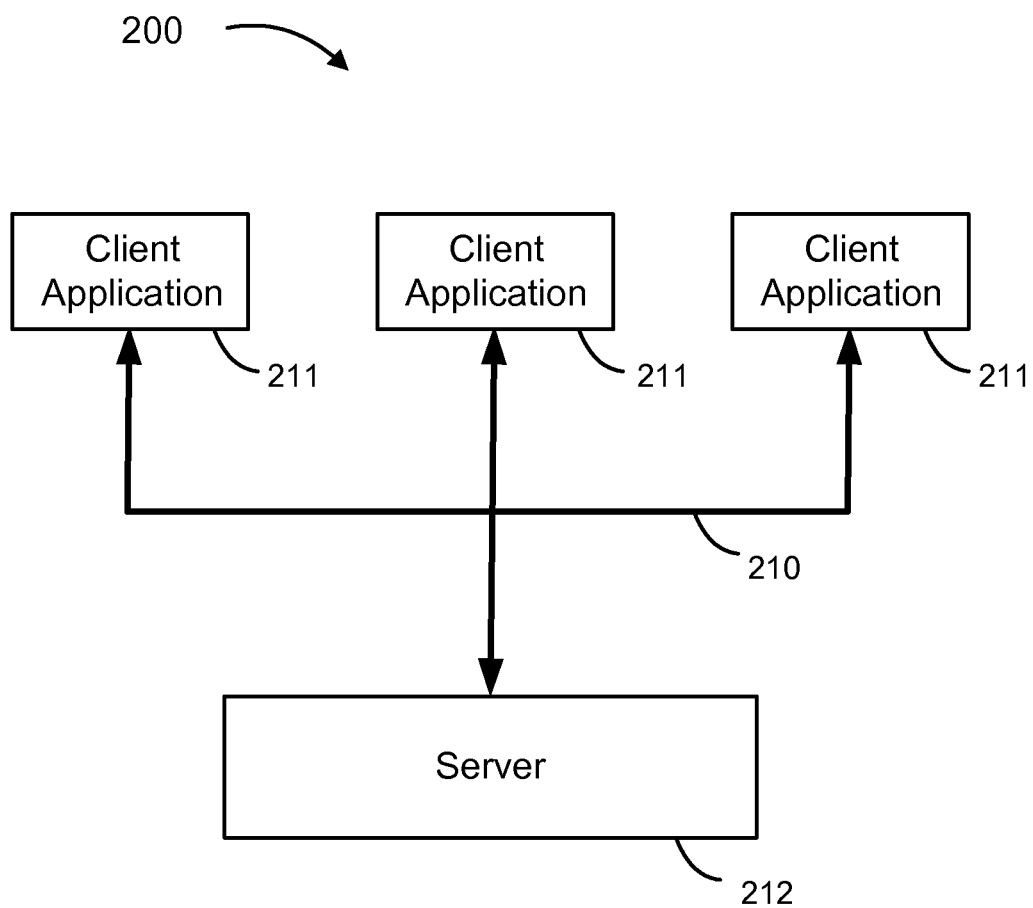
FIG. 2 is a block diagram illustrating an exemplary client-server computing environment in which aspects of the invention might be implemented.

With reference now to FIG. 2, there is illustrated a block diagram of a representative client-server computing system 200 in which aspects of the invention might be implemented. The system 200 typically has multiple client applications 211 that communicate with a server 212 through a client-sever network 210. The clients 211 and server 212 might be hardware or software computer systems, or a combination thereof, that have functional components similar to those in FIG. 1. The clients 211 generally run client applications such as a Web browser for downloading data from a Web server represented by the server 212. In another example, the client application 211 might be a database application that submits database queries to a database server 212 to be processed by the server 212. A client 211 might communicate with the server 212 using a communication protocol like the Hypertext Transfer Protocol (HTTP), Transmission Control Protocol/Internet Protocol (TCP/IP), Java Remote Method Protocol (JRMP), Internet Inter-ORB Protocol (IIOP), Simple Object Access Protocol (SOAP), and Component Object Model (COM). The services between a client 211 and server 212 can be implemented in numerous ways based on the protocol specifications.

Figure 3:
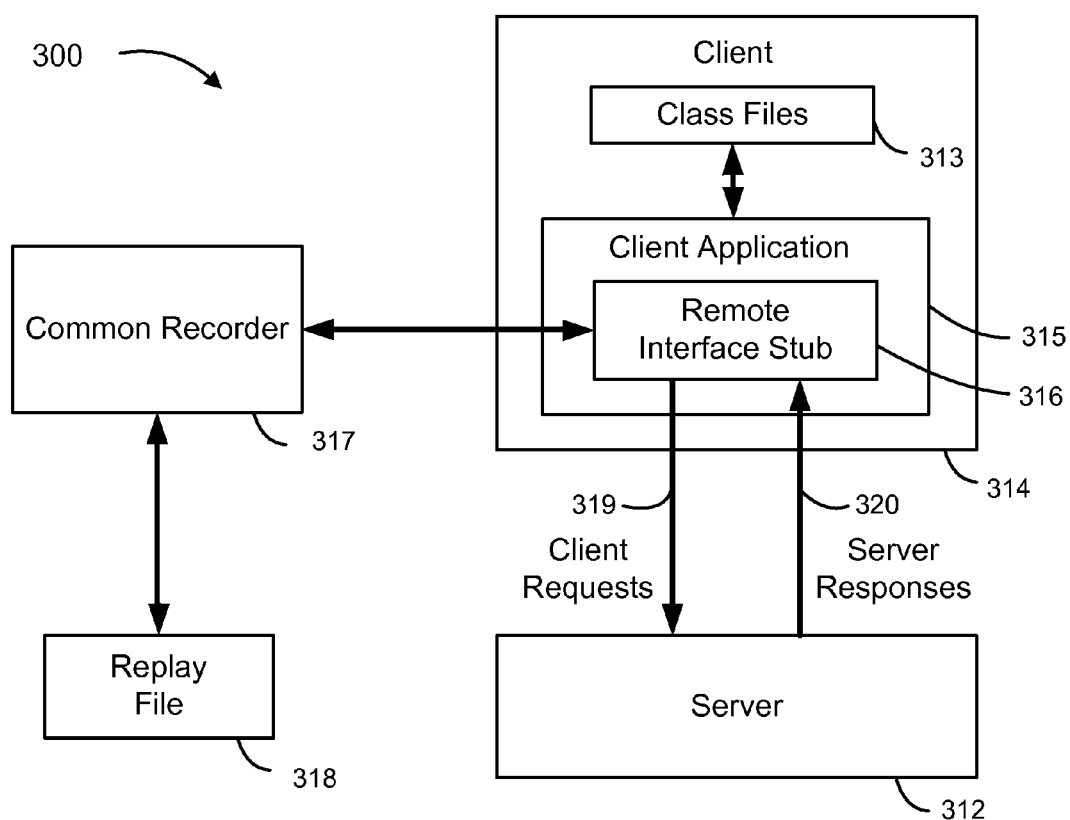
FIG. 3 is a block diagram illustrating an exemplary embodiment of a record and replay system for a client-server environment according to aspects of the invention.

FIG. 3 is a block diagram illustrating an exemplary embodiment of a recording and replaying system 300 for a client-server environment according to aspects of the invention. The system 300 includes a sever 312 and a client 314 that communicate through client requests 319 and server responses 320. A client application 315, such as a Web service application, runs on the client 314 and uses class files 313 to process client actions generated by the client application 315. The type of class files 313 depends on the particular type of the client application 315. For example, if the client application 315 is a Java application, then the class files 313 include Java class files that the client application 315 would need during its execution. If the client application 315 is a Web application, then the class files 313 include remote Web services and remote functions calls invoked by the Web application. The client application 315 has a Remote Interface Stub 316 for interfacing with a common recorder 317 and providing aspects of the invention as described below in reference to FIGS. 4-8. The common recorder 317 might run on the client 314, server 312 or another computer connected to the client 314.

During interactions between the client application 315 and the server 312, the common recorder 317 identifies particular class files 313 that the client application 315 needs for initiating and processing client actions, data passed by the client application 315 in the client requests 319, and data returned by the server 312 in the server responses 320 to the client 314. The common recorder 317 stores the identified class files 313 and data from the client requests 319 and server responses 320 in a replay file 318. Similarly to the common recorder 317, the replay file 318 might reside on the client 314, the server 312 or another computer connected to the client 314. During a later replay of the client-server interactions in another system environment, the common recorder 317 will use the data recorded in the replay file 318 to recreate the client actions, client processes and their respective results.

The class files 313 include remote method calls and function calls invoked by the client application as well as stub files, skeleton files and proxies that hold the logic for networks and input/output necessary to complete the remote calls. The data passed in client requests 319 and server responses 320 include information for identifying the server like the server's IP address and port number, data related to the remote calls and data passed in the remote call parameters. The type of data captured by the common recorder is determined from the contents of the class files. In the exemplary embodiments of the invention, the replay file 318 is a normal output text file that includes the class files, stub files, skeleton files, remote method and function calls, and data passed in the remote and function calls as captured by the common recorder.

Figure 4:
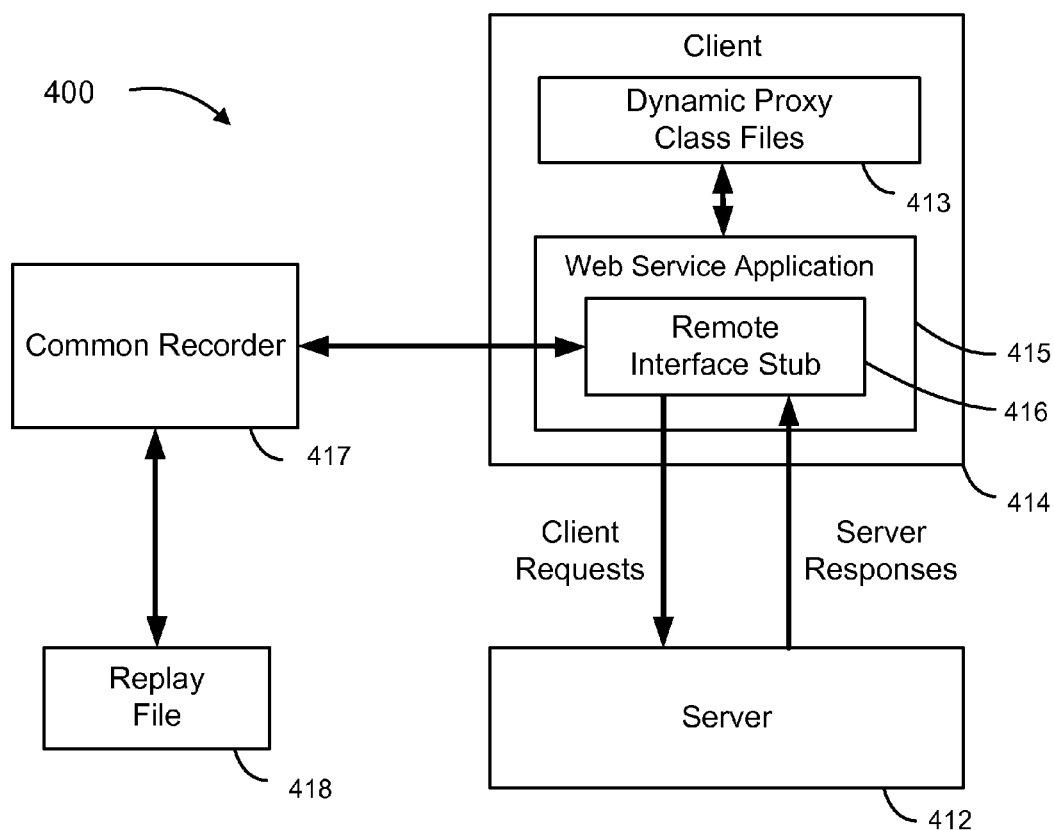
FIG. 4 is a block diagram illustrating an exemplary embodiment of a record and replay system for a Web service client-server environment, according to aspects of the invention.

FIG. 4 is a block diagram illustrating an exemplary embodiment of a record and replay system 400 for a Web service client-server environment. The client 414 and server 412 are similar to those described with reference to FIG. 3. A Web service client application 415, like a Web browser, runs on the client 414 and typically uses dynamic proxy class files 413 to process client actions that are initiated by the Web client application 415. The dynamic proxy class files 413 are client proxy class files that hold the definitions and functions of the remote service calls invoked by the client application 415.

Figure 5:
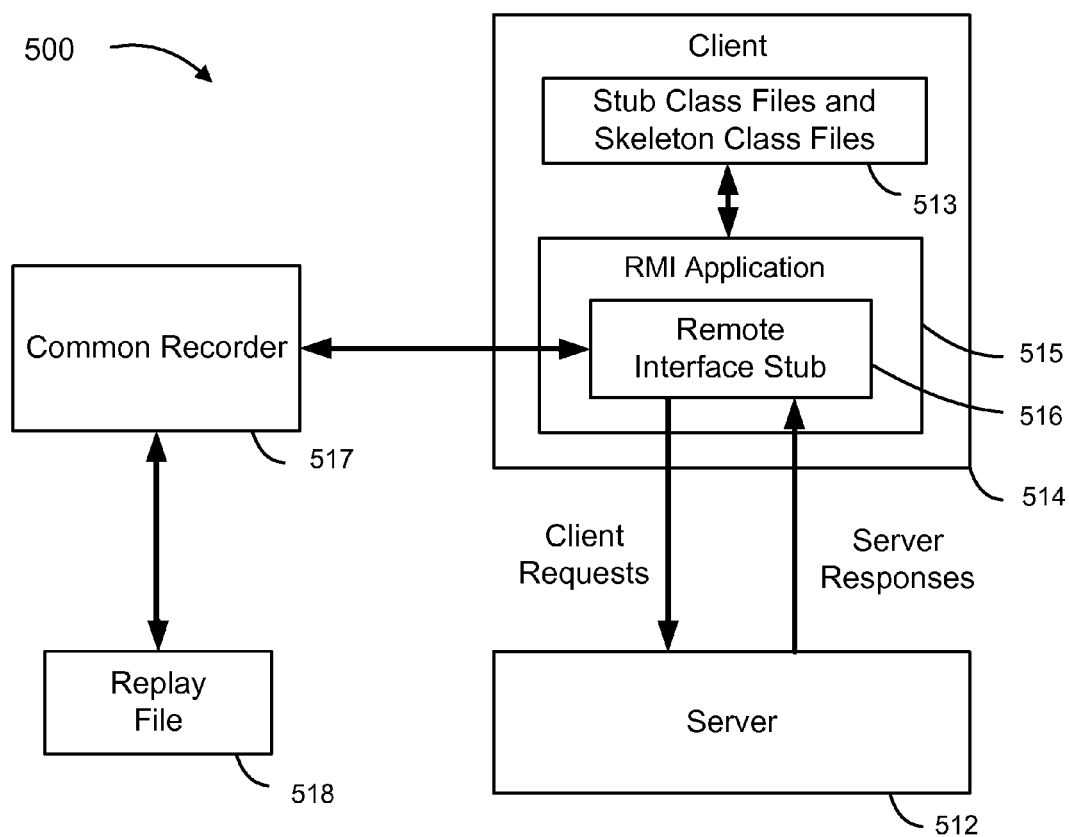
FIG. 5 is a block diagram illustrating an exemplary embodiment of a record and replay system for a client-server environment in which the client application is a Remote Method Invocation (RMI) application, according to aspects of the invention.

FIG. 5 is a block diagram illustrating an exemplary embodiment of a recording and replaying system 500 for a client-server environment in which the client application 515 is a Remote Method Invocation (RMI) application. The client 514 and server 512 are similar to those described with reference to FIG. 3. An RMI-type client application 515, such as a Java application used for invoking remote methods in a server, runs on the client 514 and uses stub and skeleton class files 513 to process client actions initiated by the RMI client application 515. The stub and skeleton class files 513 include remote functions that are defined for interacting with the server 512. These files also have the network definitions, inputs, outputs and sockets used by the RMI client application 515.

Figure 6:
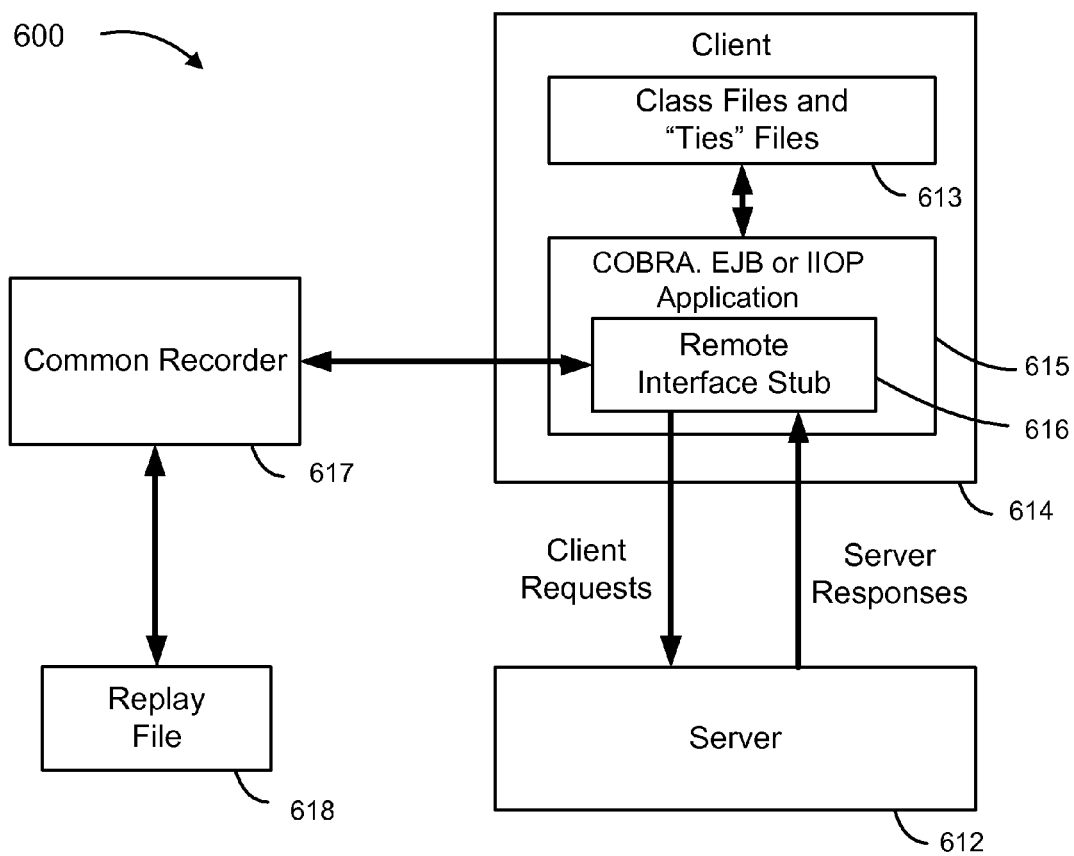
FIG. 6 is a block diagram illustrating an exemplary embodiment of a record and replay system for a client-server environment in which the client application is a CORBA, EJB or IIOP application, according to aspects of the invention.

FIG. 6 is a block diagram illustrating an exemplary embodiment of a recording and replaying system 600 for a client-server environment in which the client application 615 is a Common Object Request Broker Architecture (CORBA) application, Enterprise JavaBeans (EJB) application or Internet Inter-Orb Protocol (IIOP) application. CORBA is a mechanism in software for normalizing method call semantics between application objects that reside either in the same address space of the application or a remote address space (e.g., a remote host on a network). CORBA enables software written in multiple computer languages and running on multiple computers to work together on multiple platforms. The Enterprise JavaBeans (EJB) protocol is a managed, server-side component architecture for modular construction of enterprise applications. The Internet Inter-Orb Protocol (IIOP) is an implementation of the General Inter-ORB Protocol (GIOP) for TCP/IP. GIOP is an abstract protocol by which object request brokers (ORBs) communicate in distributed computing environments.

The client 614 and server 612 in FIG. 6 are similar to those described with reference to FIG. 3. A CORBA-type client application 615, such as a remote application that allows communications between two or more CORBA objects, runs on the client 614 and might require certain "Ties" files as well as class files 613 to process client actions initiated by the client application 615. The "Ties" files 613 for a COBRA-type application include functional code similar to that of the stub and skeleton class files in the case of a RMI application. The client application 615 might also be an EJB-type or an IIOP-type client application. Since CORBA, EJB and IIOP are basically different implementations of the same client-server communications protocol, the "Ties" files and class files for them that are examined and captured by the common recorder are generally similar in their definitions and contents.

Figure 7:
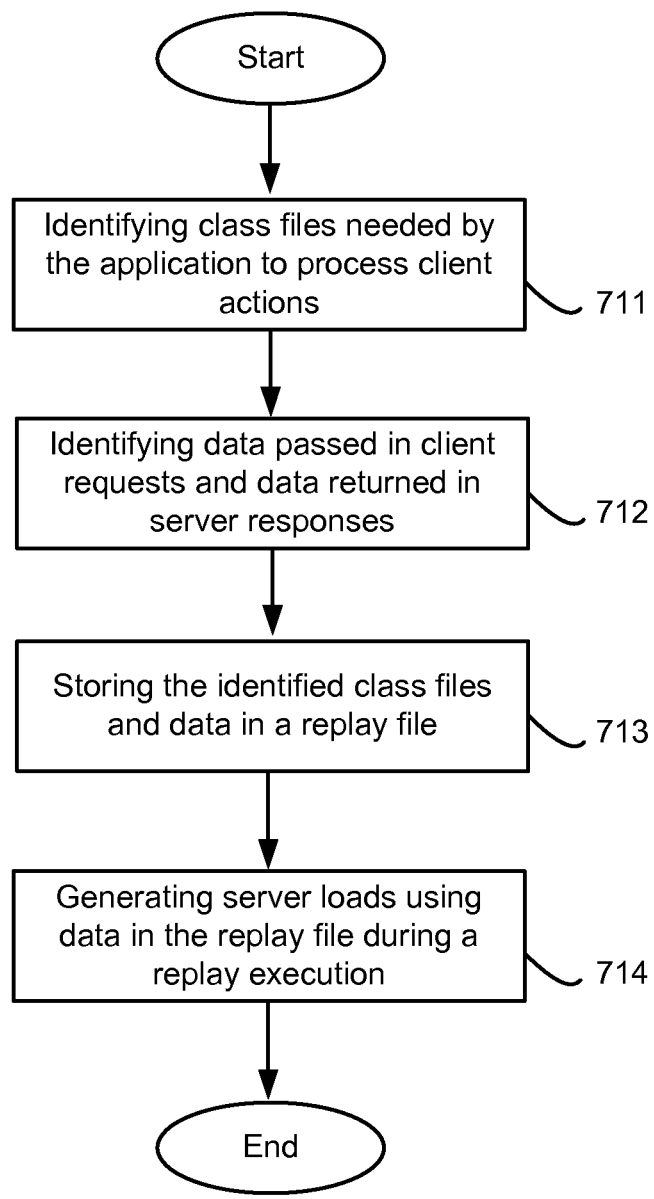
FIG. 7 is a high-level flow chart representing a process for recording and replaying an execution of a client application in a client-server environment, according to another exemplary embodiment of the invention.

Refer now to FIG. 7 which illustrates a high-level flow chart representing a process for recording and replaying an execution of a client application in a client-server environment by a common recorder, according to an exemplary embodiment of the invention. At block 711, the common recorder 317 identifies class files that the client application 315 needs to process client actions initiated by the client 314. The common recorder 317 further examines client requests 319 and server responses 320 to identify data passed in these requests and responses, per block 712. At block 713, the common recorder 317 stores the required class files 313 and identified data in a replay file 318 that would be used by a recording and replaying performance test tool during a replay of the program execution. During the replayed execution, the common recorder 317 recreates the same sever loads that the server 312 processed during the recorded execution, based on data recorded in the replay file 318. The server load generation is represented by block 714 of FIG. 7.

Figure 8:
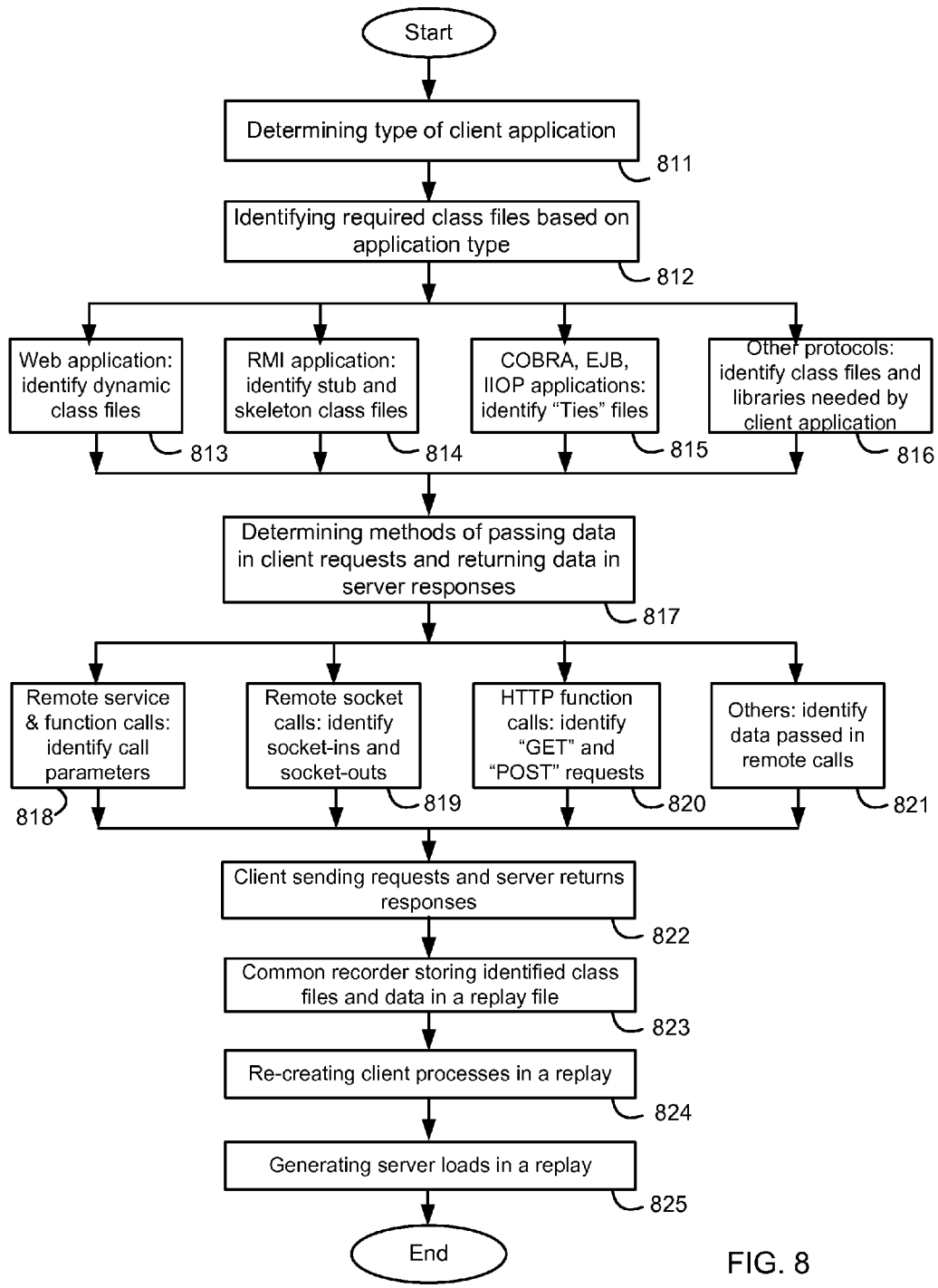
FIG. 8 is a flow chart representing a detailed process for recording and replaying an execution of a client application in a client-server environment, according to yet another exemplary embodiment of the invention.

FIG. 8 is a flow chart representing a detailed process for recording and replaying an execution of a client application 315 in a client-server environment by a common recorder 317, according to an exemplary embodiment of the invention. At block 811, the common recorder 317 determines the type of client application 315 that is running in the client computer 314 in which the application execution is to be recorded by the recorder 317. Based on the client application information, the common recorder 317 determines the relevant class files that the application 315 would need to initiate its actions during execution, as represented by blocks 813-816. For example, if the client application 315 is a Web application, then in the exemplary embodiments of the invention, the common recorder 317 identifies the dynamic class files used to process client actions, as shown by block 813. If the client application 315 includes Remote Invocation Method (RMI) function calls, then the common recorder 317 identifies the stub class files and skeleton class files used in by the RMI function calls that the client application 315 invokes, per block 814. For a client application 315 based on the CORBA, EJB or IIOP protocol implementations, the common recorder 317 identifies the "Ties" files associated with the protocol implementations, as shown by block 815. Other protocols could similarly be supported by the common recorder 317, as represented in block 816, by identifying the libraries and function calls used by the client application 315 to initiate client actions during its communication with the server 312.

The common recorder 317 further identifies data included in the requests that the client application 315 sends to the server 312 as well as data returned by the server 312 in its responses to the client requests. At block 817, the common recorder 317 determines the methods that the client 314 and server 312 use to pass data between them based on client requests 319 and server responses 320. If the client application 315 invokes remote service and function calls, then the common recorder 317 examines the stubs, skeleton class files along with the main client class files, per block 818. If the client application 315 invokes remote socket calls for communicating with the server 312, then the common recorder 317 of the exemplary embodiments identifies the socket-ins and socket-outs associated with remote calls to be captured, as shown by block 819. For HTTP function calls invoked by a Web application or Web service, the common recorder 317 examines and captures data associated with the GET and POST requests initiated by the client application 315, in block 820. Other methods for passing data between the client 314 and the server 312 could similarly be supported by identifying remote function calls from the client class files and any proxy files associated with the methods and recording data passed in the function calls, per block 821.

Continuing at block 822 of FIG. 8 where the client 314 and the server 312 communicate with each other by exchanging client requests 319 and server responses 320. During the client-server interactions, the common recorder 317 stores the identified class files and data in a replay file 318, per block 823. The recorded data in the file 318 is then used by the common recorder 317 to re-create the client application actions and results during a replayed execution, as shown by block 824. In addition, the common recorder 317 re-creates server work loads to be processed by the server 312 during the replay, per block 825.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for recording and replaying an execution of a client application in a client-server environment, comprising:

determining, by a common recorder, a type of the client application from a plurality of client application types, wherein the common recorder is configured to identify applications of each of the plurality of application types, the plurality of application types comprising: a Web service application type, a Remote Method Invocation (RMI) application type, a Common Object Request Broker Architecture (CORBA) application type an Enterprise JavaBeans (EJB) application type, and Internet Inter-Orb Protocol (IIOP) application type;

identifying, by the common recorder, particular class files used by the client application to process client actions during the execution based on the determined type of the client application, identifying, by the common recorder, data passed in client requests and data returned in server responses to be recorded using contents the identified class files;

recording, by the common recorder, the identified class files and the identified data in a replay file; and generating a server load based on the replay file by recreating actions of the client application using the data recorded in the replay file during a replay execution:
  wherein the common recorder utilizes the particular class files of the client application to interact with the server,
  wherein the common recorder interfaces with remote interface stubs of a plurality of client applications executed on at least one client,
  wherein, if the determined application the comprises the Web service application type the identifying the particular class files comprises identifying dynamic proxy class files of the client application;
  wherein, if the determined application type comprises the Remote Method Invocation (RMI) application type, the identifying the particular class files comprises identifying stub class tiles and skeleton class files of the client application, and
  wherein, if the determined application type comprises one of the CORBA application type, EJB application type, and IIOP application type the identifying the particular class files comprises identifying "Ties" files of the client application.

2. The method of claim 1, wherein the client requests include remote service and function calls initiated by the client application.

3. The method of claim 1, wherein the returned data include information for identifying the server.

4. The method of claim 3, wherein the server-identifying information includes a server IP address and a port number.

5. The method of claim 1, further comprising:
  determining a method of passing the data in the client requests and in the server responses from a plurality of methods for passing the data,
  wherein the plurality of methods of passing the data comprises remote service and function calls, remote socket calls, and HTTP function calls,
  wherein if the determined method comprises the HTTP function calls, the identifying the data comprises identifying the client requests which include "GET" and "POST" function calls and the server responses which are HTTP responses,
  wherein if the determined method comprises the remote socket calls, the identifying the data comprises identifying remote socket calls, and
  wherein if the determined method comprises the remote service and function calls, the identifying the data comprises identifying call parameters.

6. The method of claim 1, wherein the client application is an HTTP application, the client requests include "GET" and "POST" function calls and the server responses are HTTP responses.

7. A non-transitory computer readable storage medium executed by a computer having program code embodied therein and operable to:
  determine, by a common recorder, a type of the client application from a plurality of client application types, wherein the common recorder is configured to identify applications of each of the plurality of application types, the plurality of application types comprising: a Web service application type, a Remote Method Invocation (RMI) application type, a Common Object Request Broker Architecture (CORBA) application type an Enterprise JavaBeans (EJB) application type, and Internet Inter-Orb Protocol (IIOP) application type;
  identify, by the common recorder, particular class files used by the client application to process client actions during the execution based on the determined type of the client application,
  identify by the common recorder, data passed in client requests and data returned in server responses to be recorded using contents the identified class files;
  record, by the common recorder, the identified class files and the identified data in a replay file; and
  generate a server load based on the replay file during a replay execution by recreating actions of the client application using the data recorded in the replay file during a replay execution:
  wherein the common recorder utilizes the particular class files of the client application to interact with the server,
  wherein the common recorder interfaces with remote interface stubs of a plurality of client applications executed on at least one client, wherein, if the determined application the comprises the Web service application type the identifying the particular class files comprises identifying dynamic proxy class files of the client application;
  wherein, if the determined application type comprises the Remote Method Invocation (RMI) application type, the identifying the particular class files comprises identifying stub class tiles and skeleton class files of the client application, and
  wherein, if the determined application type comprises one of the CORBA application type, EJB application type, and IIOP application type the identifying the particular class files comprises identifying "Ties" files of the client application.

8. The non-transitory computer readable medium of claim 7, wherein the client requests include remote service and function calls initiated by the client application.

9. The non-transitory computer readable medium of claim 7, wherein the returned data include information for identifying the server.

10. The non-transitory computer readable medium of claim 9, wherein the server-identifying information includes a server IP address and a port number.

11. The non-transitory computer readable medium of claim 7, wherein the client application uses sockets in communicating with the server and the client requests include remote socket calls.

12. A common recorder for recording and replaying an execution of a client application in a client-server environment, comprising: a memory storing components; and a processor executing the stored components, the components comprising:
  a component for determining a type of the client application from a plurality of client application types to process client actions and responses during the execution of the client application, wherein the common recorder is configured to identify applications of each of the plurality of application types, the plurality of application types comprising: a Web service application type, a Remote Method Invocation (RMI) application type, a Common Object Request Broker Architecture (CORBA) application type an Enterprise JavaBeans (EJB) application type, and Internet Inter-Orb Protocol (IIOP) application type;
  a component for identifying particular class files used by the client application to process client actions during the execution based on the determined type of the client application, a component for identifying data passed in client requests and data returned in server responses during the execution to be recorded using contents the identified class files;

a component for recording the identified class files and data in a replay file; and a component for generating a server load based on the replay file by recreating actions of the client application using the data recorded in the replay file during a replay execution, wherein the common recorder utilizes the particular class files of the client application to interact with the server, wherein the common recorder interfaces with remote interface stubs of a plurality of client applications executed on at least one client, wherein, if the determined application the comprises the Web service application type the identifying the particular class files comprises identifying dynamic proxy class files of the client application;

wherein, if the determined application type comprises the Remote Method Invocation (RMI) application type, the identifying the particular class files comprises identifying stub class tiles and skeleton class files of the client application, and wherein, if the determined application type comprises one of the CORBA application type, EJB application type, and IIOP application type the identifying the particular class files comprises identifying "Ties" files of the client application.

13. The common recorder of claim 12, wherein the client requests include remote service and function calls initiated by the client application.

14. The method of claim 1, wherein for different client application types different types of class files are provided, and based on the determined type of the client application, type of class files from the different types of class files are identified and searched for, wherein for different methods of passing data, different types of data are provided, and wherein based on a determined method type of passing data in the client requests and the server responses, a type of data from the different types of data is identified and searched for.

* * * * *